Figure 1:
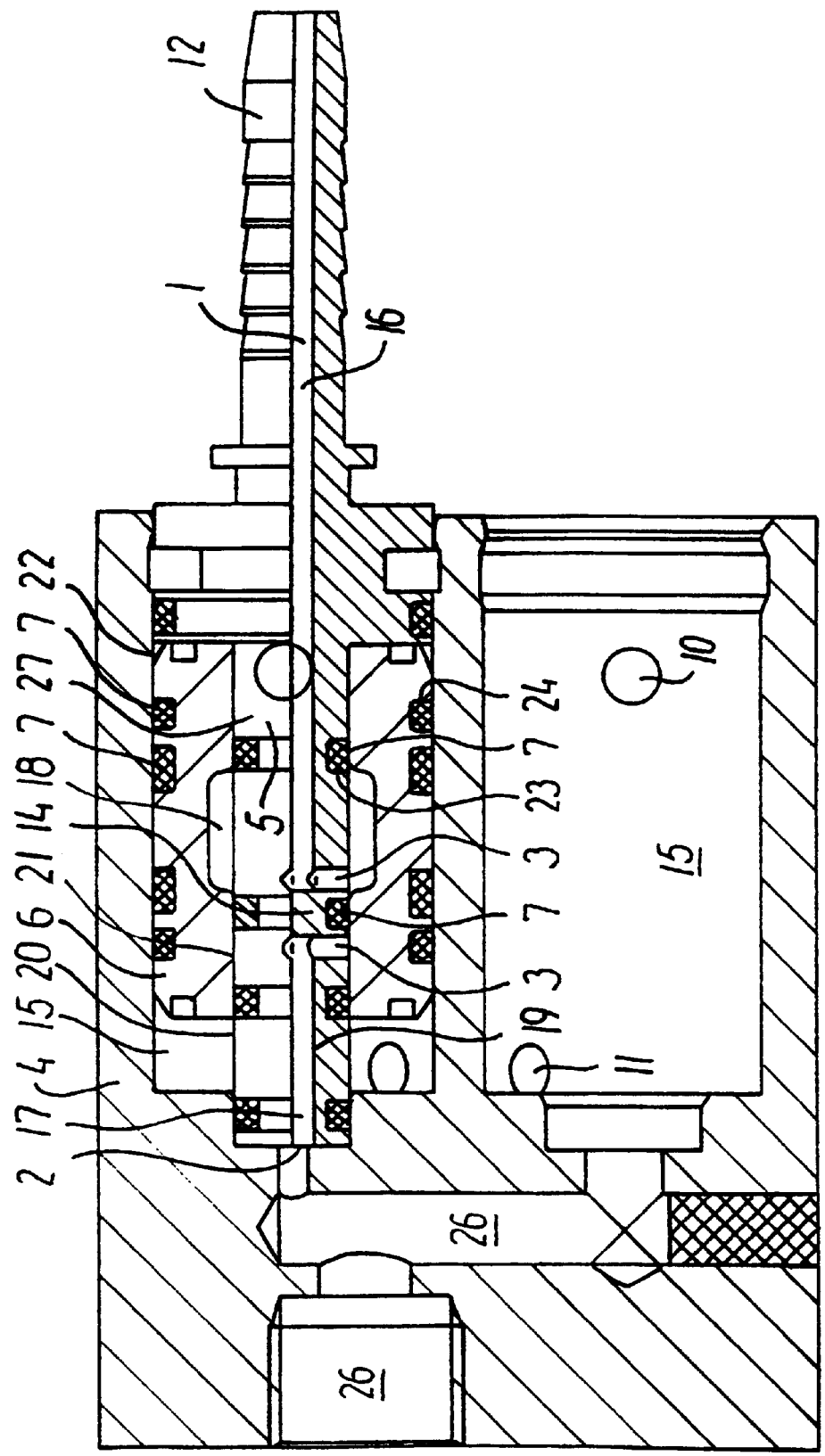

United States Patent [19]
Lund

[11] Patent Number: 6,126,139
[45] Date of Patent: Oct. 3, 2000

[54] VALVE UNIT

[75] Inventor: Bjarne Lund, Sonderborg, Denmark

[73] Assignee: A Gramkow A/S, Denmark

[21] Appl. No.: 09/125,224

[22] PCT Filed: Feb. 21, 1997

[86] PCT No.: PCT/DK97/00081

§ 371 Date: Aug. 17, 1998

§ 102(e) Date: Aug. 17, 1998

[87] PCT Pub. No.: WO97/31208

PCT Pub. Date: Aug. 28, 1997

[30] Foreign Application Priority Data

Feb. 23, 1996 [DK] Denmark ................................ 0200/96

[51] Int. Cl.[7] .............................................. F16K 31/143
[52] U.S. Cl. ................................................... 251/63
[58] Field of Search ..................... 251/63, 344; 137/606; 62/6

[56] References Cited

U.S. PATENT DOCUMENTS 3,425,664  2/1969  Niskin ....................... 251/63
4,391,103  7/1983  Sarcia .......................... 62/6
4,396,154  8/1983  Iovino et al. .............. 251/63
4,869,300  9/1989  Gudenau et al. ........... 141/59

*Primary Examiner*—Charles E. Phillips
*Attorney, Agent, or Firm*—Jones & Askew

[57] ABSTRACT

A valve unit for the evacuation and filling of media, especially liquids, in a system comprising a valve housing (4), at least two valve seats (15), in one of said valve seats there being housed a valve part for evacuation, and in the second of said valve seats there being housed a valve part for filling. The valve part (5) comprises a longitudinal channel (1) and at least two communication holes (3) extending from the longitudinal channel (1) to the valve part's outer surface (20), said channel (1) being provided with a through-flow cut-off (14) which divides the channel into two part channels, a first part-channel (16) and a second part-channel (17), said part-channels (16, 17) each comprising a communication hole (3), and a slide (6) disposed around the valve part (5), said slide (6) having at least one recess (18) on the surface (21) facing towards the valve part (5) and forming at least one closed cavity, said slide (6) being activated by the feeding of a gas or liquid medium to the valve seating.

16 Claims, 5 Drawing Sheets

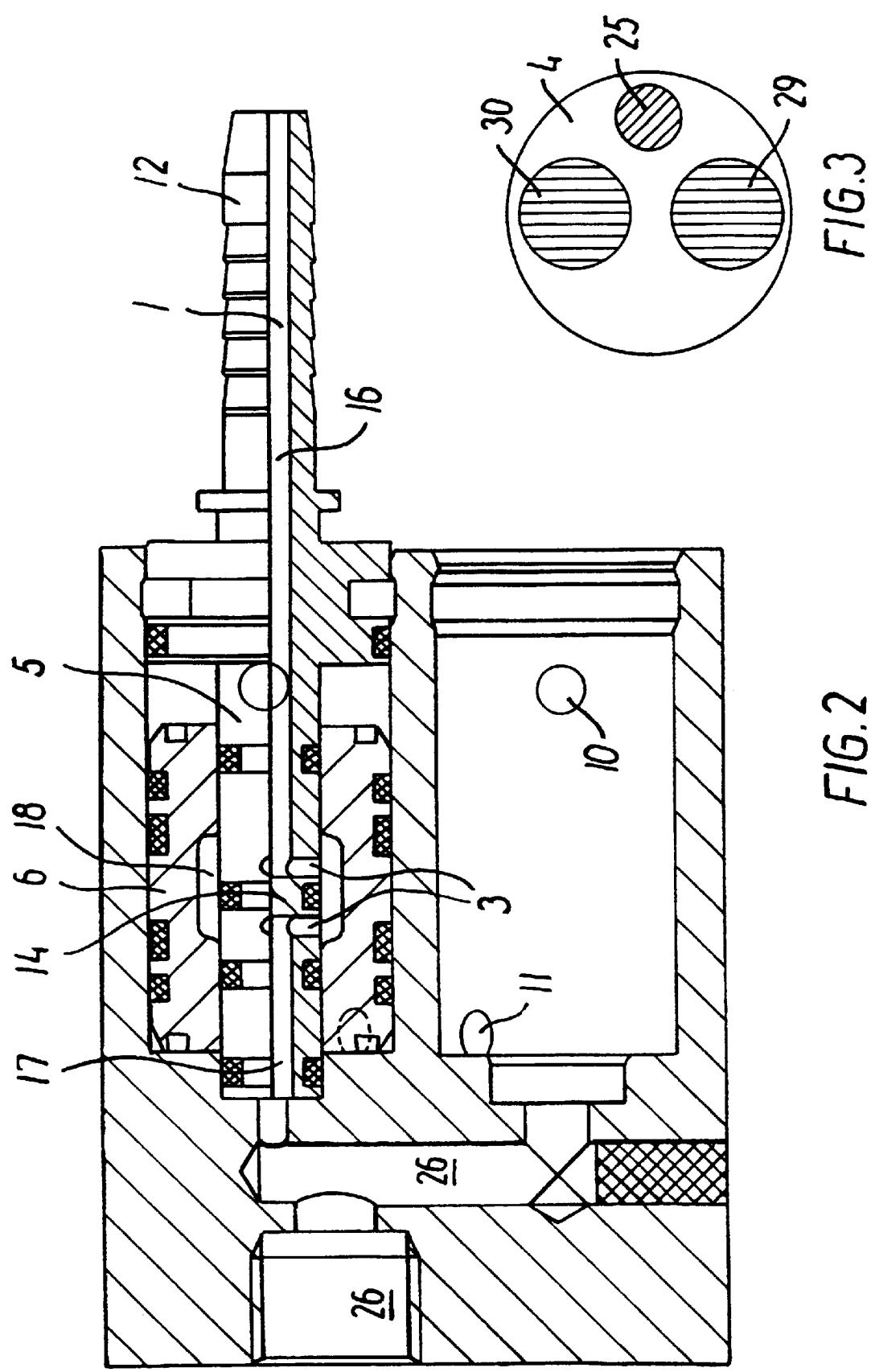

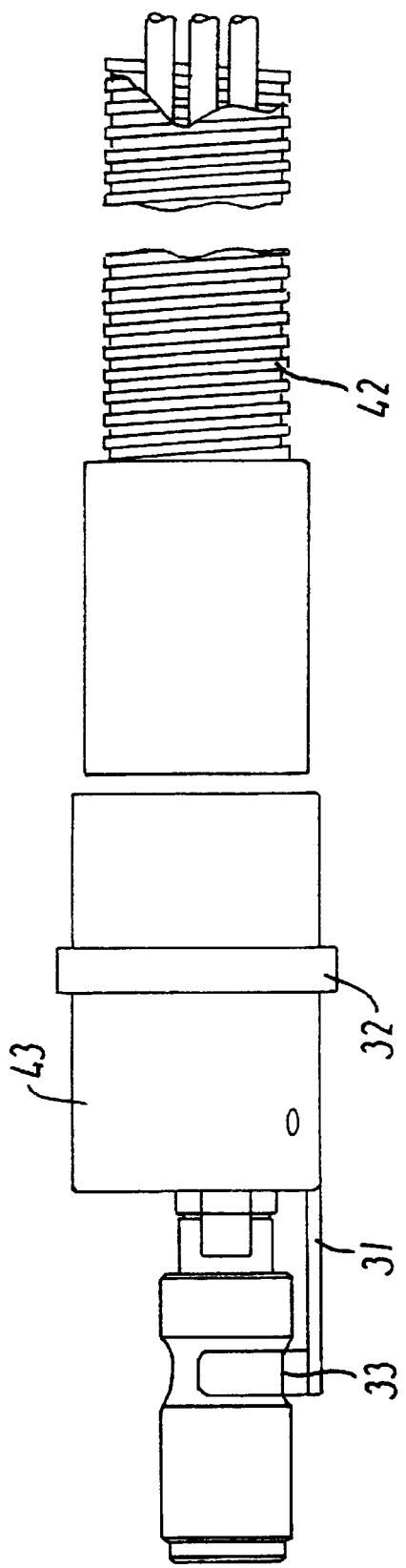
FIG.9
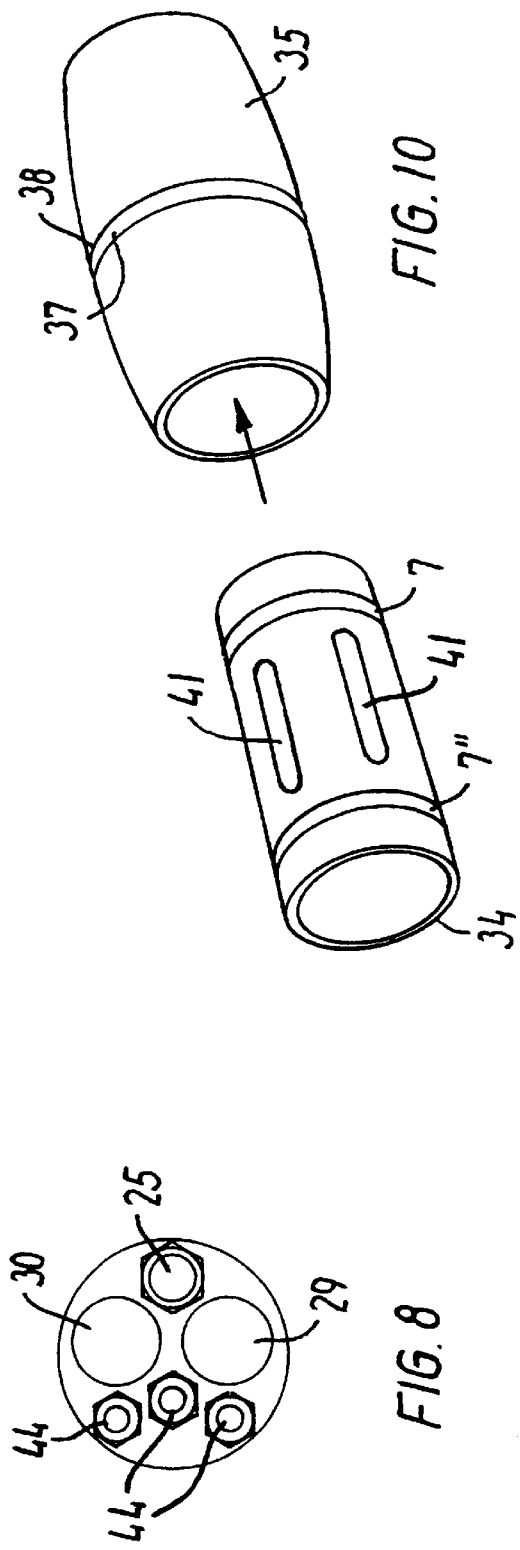
FIG.10
FIG.8

VALVE UNIT

The invention concerns a valve unit for the evacuation and filling of media, especially liquids, in a system comprising a valve housing with at least two valve seats, where in one of said valve seats there is housed a valve part for evacuation, and where in said second valve seat there is housed a valve part for filling.

From the German utility model publication 91 06 946 there is known a system for the filling of coolant, and which comprises a control arrangement which regulates the activity and mutual relationship of the individual components, including a coolant valve and a negative-pressure valve. The publication does not provide a more detailed description of the valves' expedient configuration, but on the other hand it describes their positioning in relation to the system as a whole.

From EP-A-655.571 there is known a single valve which comprises a bore in which a slide is established, and which covers over through-flow holes for establishing a passage through the longitudinal channel in the valve. The activation of the valve's slide is exclusively manual, and is unsuitable for a function where it must both evacuate and fill a system.

From U.S. Pat. No. 4,869,300 there is known a valve arrangement, typically for use in refrigeration plants, and which includes a unit which serves in the establishing of vacuum in a reservoir, and also includes a unit which serves in the dispensing of the desired fluid, typically a coolant.

The valve is composed of many and movable components, which increases the risk of leakage. Moreover, it is provided with an internal slide which opens and closes for the inlet which, among other things, as a consequence of its positioning results in a considerable loss of pressure, and herewith limitation of the filling capacity and the evacuation level.

It is the object of the invention to provide a valve unit which does not suffer the disadvantages of the known technique, and where the valve unit is built up of separate filling and evacuation valve parts, each produced from a few units with only single movable parts, in a simple, small, handy construction, whereby the risk of leakage is minimal, and where there occurs only very little wastage of the transported fluid, among other things as a consequence of the greatly reduced number of movable parts.

This object is achieved with a valve unit of the kind disclosed in the introduction, and also where the valve part comprises a longitudinal channel and at least two communication holes extending from the longitudinal channel to the outer surface of the valve part, said channel being provided with a through-flow cut-off which divides the channel into two part-channels, a first and a second part-channel, said part-channels each comprising communication holes, and a slide arranged around the valve part, said slide having at least one recess in the surface facing towards the valve part and forming at least one sealed cavity, and where said slide is activated by the feeding of a gas or liquid medium to the valve seat.

In the case where the valve unit is to be used for the evacuation of a chamber, the one end of the valve unit is fastened to the chamber and the other end to a vacuum source. The slide is now placed over both of the communication holes and the vacuum is established. As a result of the through-flow being cut off, the communication to the chamber will take place from the first to the second channel via the slide's recess and the communication holes.

When the desired vacuum has been established, the slide is moved by means of air pressure or oil into a position in which it surrounds none or only a single communication hole. It is hereby ensured that the connection between the vacuum source and the chamber is closed.

The chamber is hereafter filled with a fluid, preferably a coolant, whereby the second valve unit for filling is activated, and where the slide is controlled into the open position as described above, and whereby this thus surrounds both communication holes. After the filling, the slide is placed in the closed position so that the communication between the first and the second part-channel is cut off.

By configuring the valve unit as disclosed in claim 2, it is achieved that the slide assumes a definite contact against the valve housing, so that there is one place where there will be a close connection between the slide and the housing. If the slide is not provided with this protruding part, for example if this was completely cylindrical in configuration, the sealing between the slide and the valve housing would be determined by the shape of the valve housing, and there would be great risk of leakage between slide and valve housing. The result would be that the slide would not be able to be activated correctly, either by means of air or oil injection, and would thus not be able to evacuate the system, and neither will it be possible to effect a subsequent filling of the system inasmuch as the correct positioning of the slide has not been made possible.

By configuring the valve unit as disclosed in claim 3, it is achieved that the sealing between housing and slide is optimized, and thus that pressure drop and fluid wastage is minimized.

By configuring the valve unit as disclosed in claims 4 and 5, an expedient configuration of the slide is achieved, whereby there is a well-defined area where a part of the slide has a more protruding circumference than the rest of the slide, and where the remaining surfaces are smooth and even.

By configuring the valve unit as disclosed in claim 6, a simple manner is achieved in which to form the recess, so that there can be communication between the two communication holes. It is envisaged that the annular groove will be used especially for the filling valve, but will be less suitable for the evacuation valve.

By configuring the valve unit as disclosed in claim 7, an expedient configuration of the slide's recesses is achieved, which is particularly relevant in connection with the evacuation valve, in that during evacuation there is no fluid present. If a more simple configuration is used, such as that disclosed in claim 6, there is a great risk at the moment that the slide is activated that the seals, which must be between the slide and valve part, will break down due to the friction between the two parts. When the slide's recesses, which establish connection between the communication holes, are provided with slots, it is ensured that the sealing rings in the evacuation valve do not break down so easily and thus that they have a longer lifetime, which is why the valve does not develop leaks. Experiments have shown that if use is made of a slide configuration for the evacuation valve as disclosed in claim 6, the lifetime of the evacuation valve will be reduced quite considerably.

By configuring the valve unit as disclosed in claims 8 and 9, the establishing of the open and closed position respectively is achieved.

By configuring the valve unit as disclosed in claims 10 and 12, a sealing abutment between slides and valve part and valve part and valve housing respectively is achieved, so that pressure drop and fluid wastage is minimized.

By configuring the valve unit as disclosed in claim 11, a tight abutment is achieved in this area, so that possible fluid can not gain access from the one communication hole to the other communication hole via this way.

By configuring the valve unit as disclosed in claim 13, it is achieved that all the places where the slide moves against the valve part are protected by O-rings and a marked reduction of the friction. This teflon coating on the O-rings is necessary where the evacuation valve is concerned, the reason being that the evacuation valve's O-rings will not be lubricated by fluid at the moment when the slide moves from the one position to the other position. With regard to the coating of the O-rings with teflon for those parts which are in abutment with movable parts, it should be noted that this will extend the lifetime of the O-rings, but is not a necessity to the same extent.

By configuring the valve unit as disclosed in claim 14, it is not necessary to remove a supply pipe from the stub when removing the valve part from the valve housing, for example in connection with the replacement of the sealing rings/O-rings. Since this is effected relatively often because of the aggressive environment which frequently arises, this is a particularly labour-saving arrangement.

By configuring the valve unit as disclosed in claim 15, the possibility is achieved of being able to use couplings of various makes and types.

By configuring the valve unit as disclosed in claim 16, it is achieved that the temperature of the medium, for example in the form of coolant, can be raised or regulated upon conclusion of the filling in order to force out the remainings. The amount of remainings is reduced considerably, so that this lies in the order of 0.1 gram per filling, as opposed to several grams earlier.

By configuring the valve unit as disclosed in claim 17, a considerable reduction in the weight of the valve unit is achieved and, in addition, the heat regulation from the heating element is optimized due to the excellent thermal conductance characteristics of the aluminium.

Figure 4:
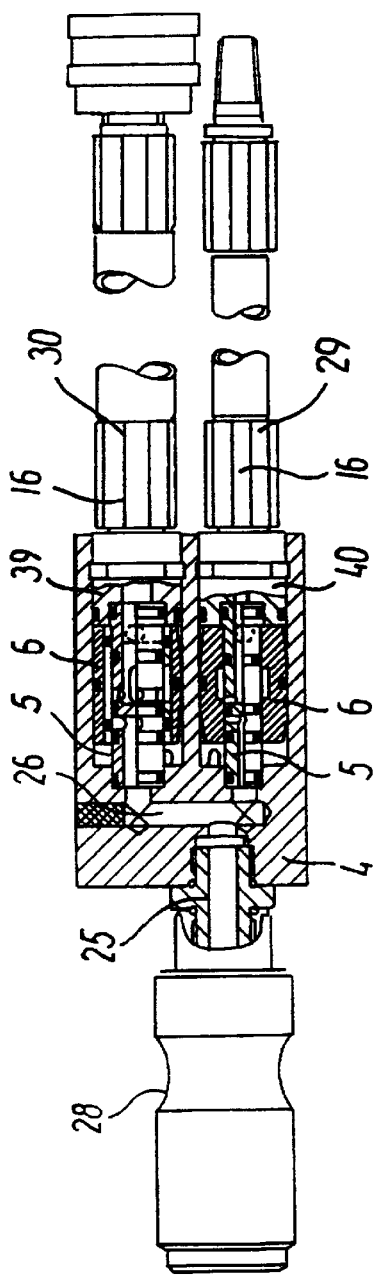
Figure 5:
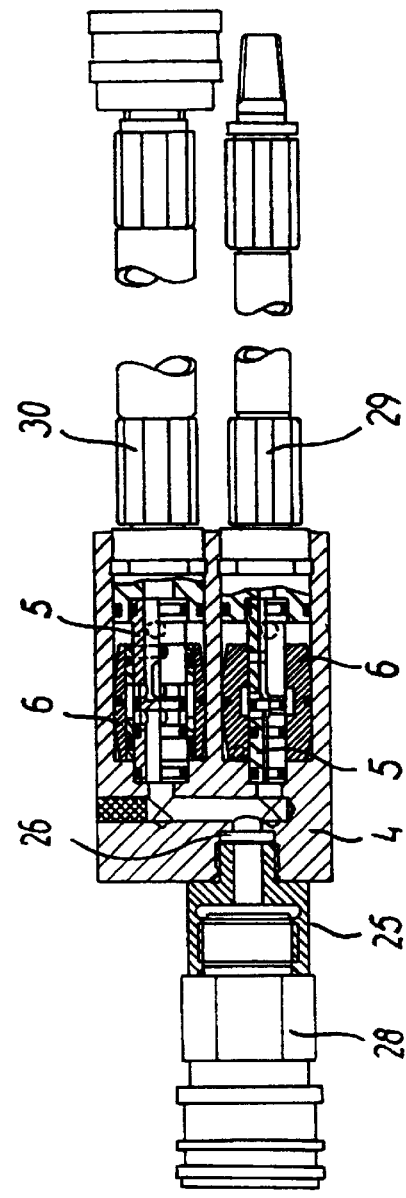
Figure 7:
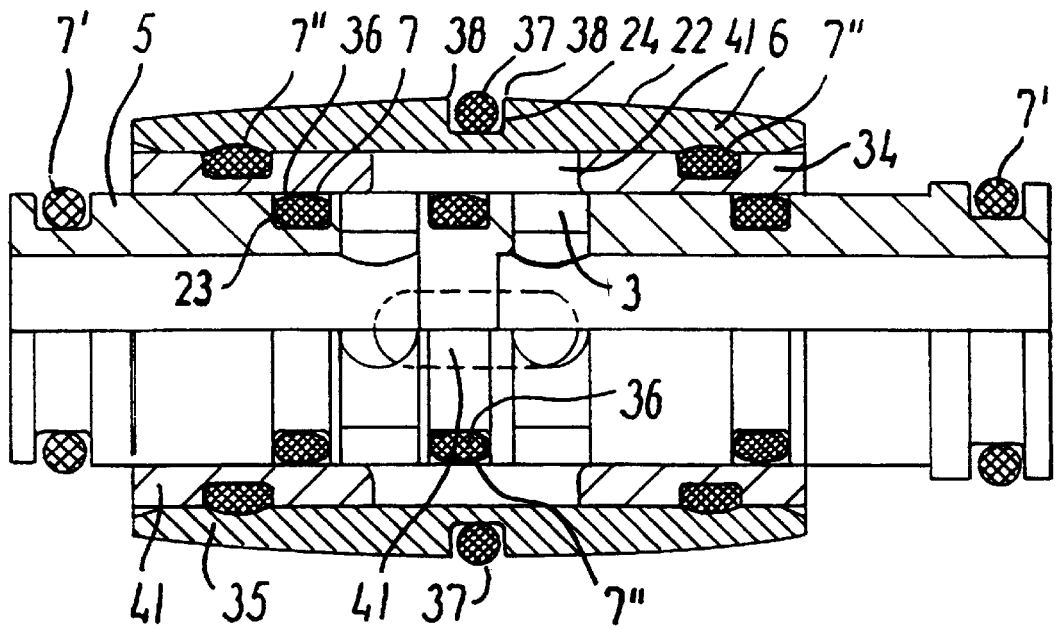
Figure 6:
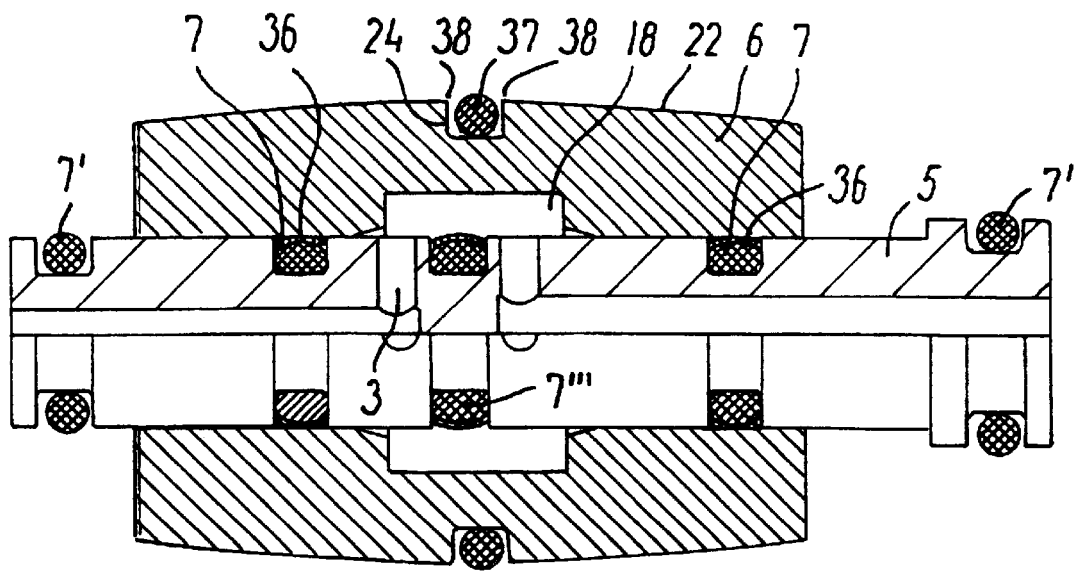

The invention will now be described in more detail with reference to the drawing, in that FIG. 1 shows individual parts in an embodiment of the valve unit in the closed position for the filling valve part and seen in longitudinal section, FIG. 2 shows individual parts in the valve unit shown in FIG. 1, in the open position and seen in longitudinal section, FIG. 3 is a principle drawing showing the mutual relationship between the valve parts with slide and heating element, FIG. 4 shows a longitudinal section of a preferred embodiment for the valve unit, in the closed position for the filling valve part and evacuation valve part and with one type of adapter mounted, FIG. 5 shows a longitudinal section of a preferred embodiment for the valve unit, in the open position for the filling valve part and evacuation valve part and with another type of adapter than that shown in FIG. 4, FIG. 6 shows a longitudinal section of valve-like slides for the filling function, FIG. 7 shows a longitudinal section of valve-like slides for the evacuation function, FIG. 8 shows a section along the line A—A in FIG. 4, FIG. 9 shows the valve unit with surrounding jacket and with protection hose and coupling mounted, and FIG. 10 shows a configuration of the evacuation slide and composed of two units.

FIG. 1 shows a valve unit comprising a valve housing 4 and two valve seats 15, where for the sake of clarity only one valve part 5 is seen in the one seat 15 and with a slide 6 placed around the valve part 5.

The shown valve part 5 is for the filling of a plant, while the second seating will house a valve part for the evacuation of the plant.

The valve part 5 is composed of a body part 27 and a stub part 12 and is an integrated entity.

Through the valve part 5 there extends a longitudinal and straight channel 1 which is provided with a through-flow cut-off 14, which similarly constitutes an integrated part of the valve part 5. The through-flow cut-off 14 prevents free flow through the channel 1, which is thus divided into a first part-channel 16 and a second part-channel 17. From the longitudinal channel 1 and out to the outer surface 20 of the valve part 5, the valve part is provided with communication holes 3—in the shown example embodiment there are two in number—said holes lying with a distance between them which does not exceed the longitudinal extent of the recess 18 in the slide 6. The communication holes 3 ensure that fluid or vacuum can be established with circulation from the longitudinal channel's first part-channel 16 to the longitudinal channel's second part-channel 17. The valve part's outer surface 20 is provided with grooves 23 in which O-rings 7 are placed. These sealing rings 7 ensure a tight abutment between the valve part 5 and the valve housing 4 where these are in contact with each other, and a tight abutment between the valve part 5 and the slide 6 where these are in contact with each other.

The one end of the valve part is provided with a stub 12 which constitutes an integrated part of the valve part. It is hereby ensured that when the valve part with slide 6 is taken out of the valve housing 4 for replacement of the O-rings 7, it is not necessary to disconnect the hose, which is a time-consuming and troublesome process.

Around the body part 27 of the valve part 5 there is a slide 6, the inner surface 21 of which lies tightly up against the outer surface 20 of the valve part, though in such a manner that the inner surface 21 of the slide 6 has a recess 18 forming a closed cavity. The inner surface 21 of the slide 6 and the outer surface 22 of the slide 6 are circular in cross-section. The slide's outer surface 22 is provided with grooves 24 in which gaskets 7 are inserted. A sealing abutment is hereby achieved between the slide 6 and the valve housing 4 itself.

In that end of the valve part which lies opposite the stub 12, the second part-channel 17 of the longitudinal channel 1 communicates via an opening 2 with a second channel 26 provided in the valve housing, said channel being connected possibly via other channels to that chamber in which vacuum and/or fluid is desired to be established/filled.

The second valve seating shown in FIG. 1 comprises a valve part 5 with slide 6 which in principle functions in the same way as that described above, but it will be configured in another way, in that it functions as the evacuation part.

The closed function itself will now be explained in the following. The slide 6 is arranged in such a way over the valve part that the recess 18 in the slide 6 surrounds none or only one of the communication holes 3, said communication hole being disposed in the first part-channel 16 of the longitudinal channel 1. Since there is thus no communication between the longitudinal channel due to the positioning of the through-flow cut-off 14, and since the two communication holes 3 can not communicate with each other due to the position of the slide 6, the valve is now in the closed function.

The open function will now be explained with reference to FIG. 2. When the valve is desired to be opened, the slide 6 moves over into that position where the recess 18 in the slide 6 surrounds both of the communication holes 3, which are disposed in each their part-channel 16 and 17. When vacuum is desired to be established or filling with fluid is desired, there is now communication from the stub to a not-shown chamber which stands in connection with the channel 26, in that vacuum or fluid can move from the first part-channel 16 to the second part-channel 17 via the two holes 3 and through the recess 18 in the slide 6.

The movements of the slide 6 are activated by compressed air, which when the closed function is established is led through an opening 11 in front of the slide in the cavity in which this moves, and upon establishing of the open function the compressed air is led through an opening 10 lying in the opposite end of the opening 11 in the cavity in which the slide moves.

FIG. 3 is a sketch showing a section through the valve housing, where there is also provided a heating element 25 at a distance from the two valve parts with slides. The object of the built-in heating element is to adjust the temperature, so that the temperature of the fluid which lies in the valve housing achieves the correct values. When the temperature of the coolant, for example, is raised upon conclusion of the filling, the amount remaining in the valve will be forced out into the plant, whereby the fluid remaining in the valve is reduced to the least possible amount. There can thus be effected a reduction from several grams to approx. 0.1 grams coolant per filling.

During filling with the coolant, the valve without heating will be cooled down to approx. 10°, in that here the expected typical filling amount will be 800 grams, whereby the pressure in the valve unit will be equal to or less than that of the closed system which is being filled. The temperature in the closed system reaches approx. 20°. The result is that the amount left in the dead-volume remains standing. This is remedied by mounting the above-mentioned heating element 25, so that the temperature in the valve unit is 32–36° before filling and approx. 5° lower after filling, which ensures a higher temperature in the valve unit with consequently higher pressure, so that the coolant remainings are reduced. Moreover, in this way it is also ensured that condensation problems do not arise in the subsequent evacuation.

The plant is typically used in connection with refrigeration plants which require to be evacuated before the actual filling with coolant takes place. The chamber which is required to be filled must have a low pressure of around 0.5–5 millibars absolute, which cf. the above is achieved by means of an evacuation arrangement.

The valve housing can with advantage be made of an aluminium alloy, whereby there is achieved a light construction which at the same time has good thermal conductance characteristics in relation to the conductance of heat desired from the heating element 25 to the valve components.

FIGS. 4 and 5 respectively show a valve unit in the closed position and a valve unit in the open position. The valve unit differs in principle from that shown in FIGS. 1 and 2 in that the slide 6 is not of cylindrical configuration but rather more barrel-shaped, which will be explained in more detail with reference to FIGS. 6 and 7.

FIGS. 4 and 5 thus show a valve housing 4, in the one end of which a coupling 28 is connected via an adapter 25 to a cavity 26 in the valve housing 4. From the channel 26 there is connection to the two valve seats 15, where the valve seat's opening which lies nearest to the coupling is that part of the valve which it is the object to fill. The placing of the filling-valve part in almost a straight line with the coupling reduces the turbulence during the filling. As shown, the evacuation valve is disposed above the filling valve. At the other end of the valve housing, each of the two valve seats open out into a stub on which a filling hose 29 and an evacuation hose 30 are coupled respectively.

The adapters 25 for the connection of the valve housing 4 with the coupling 28 are adapted as a function of the chosen coupling. Thus the adapter 25 in FIG. 4 is formed in another way than that shown in FIG. 5, in that for the sake of illustration use has been made of different couplings. FIG. 4 shows a WEH coupling, whereas the coupling shown in FIG. 5 is a CEJN coupling.

The evacuation valve and the filling valve will now be explained in more detail with reference to FIGS. 6 and 7, in that FIG. 6 shows a filling valve and FIG. 7 shows an evacuation valve. These are configured following the same construction principle and have the same outer dimensions, and consist of a valve part 5 and a slide 6, but where there are different dimensions on the two components. The valve part 5 is provided with two static sealing rings 7' which ensure tightening in relation to the valve housing 4 and the hose connection. The two outer sealing rings 7" between the evacuation slide's two parts provide a seal between the medium and the control air, and the centremost seal 7''' provides a seal between the open and closed function of the valve.

Concerning the sealing rings 7 and 7''', which provide a seal between slides and valve parts, it should be noted that these are in turn coated with a teflon material, either a delta seal or a cave seal, the object of which is to reduce the friction and keep the centremost sealing ring 7''' in its groove when exposed to dynamic load. This seal is a necessity in connection with the construction of the evacuation valve, in that during evacuation there is no natural lubrication. Where the filling valve is concerned, the seal is not necessary but is highly preferable, in that it will extend the lifetime of the sealing rings 7, 7'''.

In order to reduce the wear on the above-mentioned centremost sealing ring, which is provided between the two communication holes, the slide 6 is provided with slots which connect the open and closed sides.

The slide 6 is configured with a protruding part and is preferably shaped like a barrel or possibly a ball-slide. There is hereby achieved a well-defined area which is in abutment with the inner surfaces of the valve seat, in that in this area with the protruding parts 38 a recess is ground, a keyway, in which a sealing ring 37 is inserted. The inner surfaces of the slide 6 still comprise a recess 18, which where the filling valve is concerned is identical to that explained in connection with FIGS. 1–2. Where the recess for the evacuation valve is concerned, this is changed so that it comprises several longitudinal slots 41, the length of which is determined in such a manner that when they are placed over the communication holes 3, they ensure that there will be free passage between the holes. The reason for providing the slide with internal slots instead of an annular recess is that there is no natural lubrication of the movable parts in the evacuation valve, which makes it necessary to ensure that internally the slide has a definite contact surface which, unlike the case where there is a recess with rounded corners, will give rise to a tearing-out of the inserted sealing rings.

For the evacuation valve, the slide 6 is typically made in two parts, as will be explained in more detail with reference to FIG. 10. The slide 6 thus consists of an inner slide part 34 and an outer slide part 35. The inner slide part, which is cylindrical in shape, is provided with longitudinal slots 41 in an expedient pattern around the whole of the inner slide's circumference. The outer circumference of the inner slide will also be provided with recesses for the insertion of sealing rings. Moreover, there is provided an outer slide 35, which is barrel-shaped, and which in its protruding part 38 has an annular recess for the insertion of a sealing ring 37. The outer slide part 35 is pushed in over the inner slide part 34 and, as a consequence of the inner slide part's recesses with the inserted sealing rings 7", there will be a tight connection between the two parts so that a false passage does not arise between the inner and the outer slide parts.

FIG. 8 shows a section along the line A—A in FIGS. 4 and 5, and shows the valve housing seen from the end, where the upper section is through the evacuation hose 30 and the lower section is through the filling hose 29. Moreover, the valve housing 4 is provided with various air control valves 44 for the slides.

FIG. 9 shows the complete valve unit, where the evacuation and filling hoses are provided with a protection sleeve 42, and where the valve housing itself is enclosed within a plastic material 43, the preferable selection being a material of the delril type. This ensures a convenient handling in the use of the valve unit. Furthermore, around the jacket 43 there is placed a ring 32 which, via a connection part, is connected to a release fork 33 which clamps upwards around the coupling 28. This ensures an easy dismantling of the coupling 28, in that when an attempt is made with the fingers to slide the ring off, the forces are transferred via the connection piece 31 to the release fork 33, which in turn transfers the forces to the coupling for its disassembly. Since the release element is in the form of a ring, it does not matter in which position the valve unit operator is standing in relation to the valve unit.

The only part which moves in the valve housing itself is the slide 6, which means that the risk of mechanical defects is minimal.

The advantage of the system is, among other things, that the valve parts are easy to remove, because the valve as such can be replaced in the assembled state. It can thus be drawn out of the valve housing as a whole for service, which makes servicing much more simple in that the hose remains sitting on the stub, after which the O-rings can be replaced. Due to the particularly aggressive environment in which the valve unit is situated, the replacement of the O-rings is a frequent requirement.

The actual evacuation and filling functions are carried out automatically via control elements which are not discussed in detail, in that these follow known principles. The valve parts are made of a suitable metal alloy, for example stainless steel, but other materials can also be contemplated.

I claim:

1. Valve unit for evacuation and filling of media, especially liquids, in a system comprising a valve housing with at least two valve seats, in one of said valve seats there being disposed a valve part for evacuation, and in said second valve seat there being disposed a valve part for filling, characterized in that each valve part (5) comprises a longitudinal channel (1) and at least two communication holes (3) extending from the longitudinal channel (1) to the valve part's outer surface (20), said channel (1) being provided with a through-flow cut-off (14) which divides the channel into two part-channels, a first part-channel (16) and a second part-channel (17), each of said part-channels (16, 17) comprising a communication hole (3), and a slide (6) arranged around the valve part (5), said slide (6) having at least one recess (18) on the surface (21) facing towards the valve part (5) and forming at least one closed cavity, said slide (6) being activated by the feeding of a gas or liquid medium to the valve seat.

2. Valve unit according to claim 1, characterized in that at least a cross-section of the outer circumference of the slide (6) is protruding in relation to the rest of the slide's outer surface.

3. Valve unit according to claim 2, characterized in that in the protruding circumference of the slide (6) there is provided an annual groove in which a sealing ring (37) is placed.

4. Valve unit according to claim 1, characterized in that the outer surface of the slide is barrel-shaped.

5. Valve unit according to claim 1, characterized in that the cavity (18) at the most surrounds the communication hole (3) in the first channel (16) when the slide (6) is in the closed position.

6. Valve unit according to claim 1, characterized in that the slide (6) comprises a recess (18) which is configured as an annular groove.

7. Valve unit according to claim 1, characterized in that the recess (18) in the slide (6) is configured as several slots longitudinal to the slide (6) forming a corresponding number of closed cavities.

8. Valve unit according to claim 1, characterized in that the cavity (18) surrounds both communication holes (3) when the slide (6) is in the open position.

9. Valve unit according to claim 1, characterized in that the outer surface (20) of the valve part (5) is provided with grooves (23) in which sealing rings (7, 7', 7''') are placed.

10. Valve unit according to claim 9, characterized in that the one groove with sealing ring(s) is disposed between the two communication holes (3).

11. Valve unit according to claim 1, characterized in that the outer surface (22) of the slide (6) is provided with at least one groove (24) in which a sealing ring (7, 37) is placed.

12. Valve unit according to claim 11, characterized in that the sealing rings (7, 7''') lying in the valve part's outer surface are provided with a friction-reducing layer on that surface which faces towards the inner surface of the slide.

13. Valve unit according to claim 1, characterized in that each valve part (5) also comprises a stub (12) which constitutes an integrated part of the valve part.

14. Valve unit according claim 13, characterized in that in the end of the valve housing opposite the stubs there is a cavity for the positioning of an adapter, said adapter clamping around a coupling for the filling of the system.

15. Valve unit according to claim 1, characterized in that the valve housing (4) also comprises a heating element (25).

16. Valve unit according to claim 15, characterized in that the valve housing is made of an aluminium alloy.

* * * * *